Figure 1:
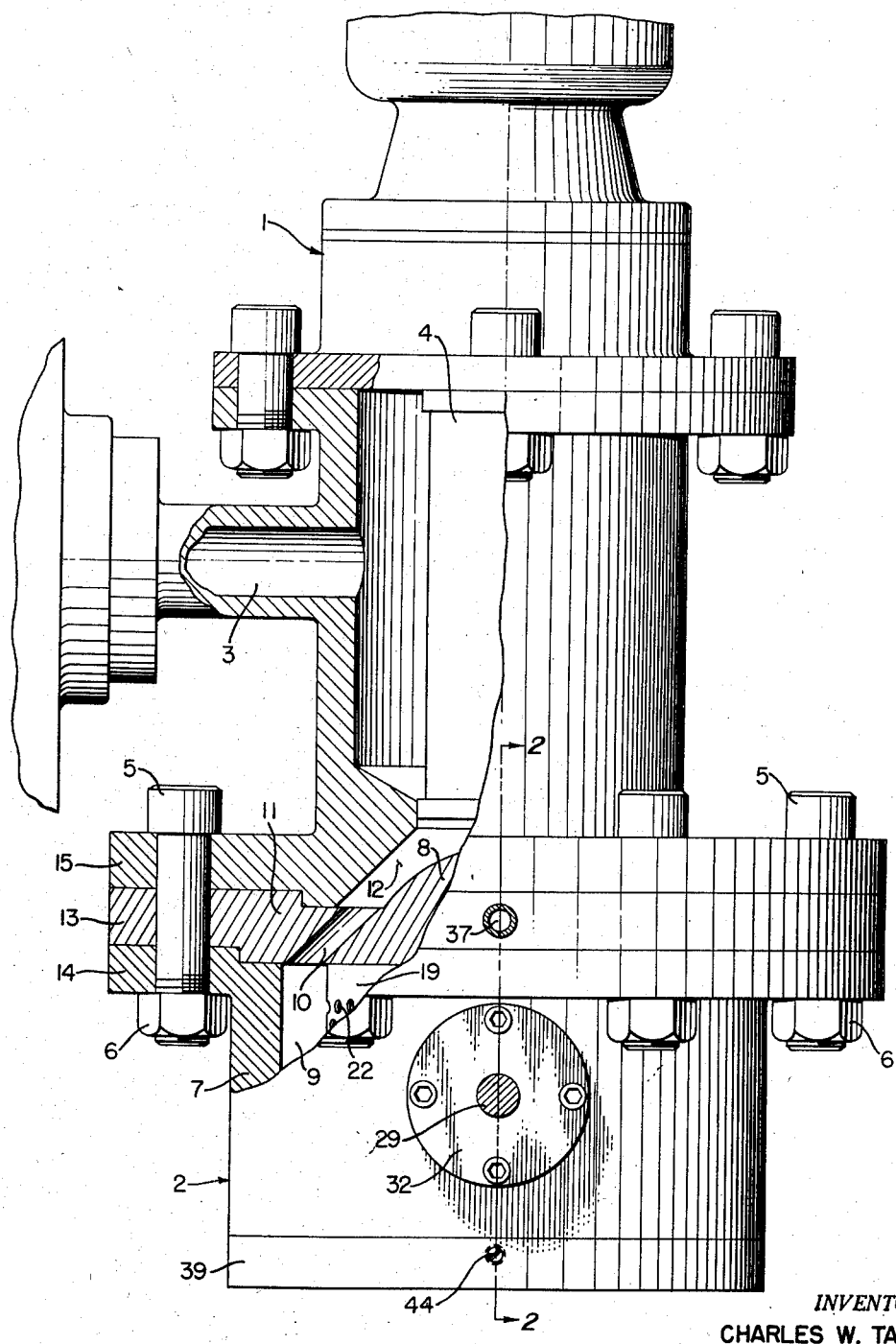

Oct. 20, 1959

C. W. TAYLOR 2,908,938

EXTRUSION APPARATUS

Filed Aug. 23, 1955

2 Sheets-Sheet 1

INVENTOR.
CHARLES W. TAYLOR

BY

R. L. Miller
ATTORNEY

Oct. 20, 1959   C. W. TAYLOR   2,908,938
EXTRUSION APPARATUS
Filed Aug. 23, 1955   2 Sheets-Sheet 2

INVENTOR.
CHARLES W. TAYLOR
BY
R. L. Miller
ATTORNEY

United States Patent Office 2,908,938
Patented Oct. 20, 1959

2,908,938

EXTRUSION APPARATUS

Charles W. Taylor, Akron, Ohio, assignor to The Goodyear Tire & Rubber Company, Akron, Ohio, a corporation of Ohio Application August 23, 1955, Serial No. 530,081

7 Claims. (Cl. 18—14)

This invention relates to an improved method and apparatus for the continuous extrusion of plastic materials.

In the manufacture of extrusions from plastic materials a troublesome problem has been to prevent what has been commonly referred to as die or closure lines, which are usually formed in the extruded product. It has been the belief that such lines were formed as the material joins together after flowing around obstructions in the path of travel or by minute imperfections in the die which affected the material as it was extruded through the die opening. These lines cause the material to have a non-uniform transverse strength as well as a reduced lateral strength due to the presence of the lines. Other properties are also affected. Some materials develop non-uniform properties as the result of orientation or "grain." As a result, many products either are not satisfactory for certain uses or more material is required in order to attain the desired physical strength. It is apparent that the presence of the die or closure lines may or may not be observed, due to the nature of the materials, but nevertheless such lines are present.

In the manufacture of extruded plastic films where the material is extruded, inflated and then stretched, it is essential that the extruded tube be as free as possible from die and closure lines if the film is to have the optimum properties such as longitudinal and transverse strength, transparency, etc. In other extrusion products such as hose, tubing, tire treads, etc. the optimum physical properties of the material are not obtained if die or closure lines are present.

It is therefore an object of this invention to provide an apparatus for extruding materials that will eliminate die and closure lines.

A second object of the invention is to provide an extrusion head that is economical and relatively simple to manufacture.

Another object of the invention is to provide a novel method of extruding materials that will eliminate die and closure lines.

A further object of this invention is to provide a novel method of extruding that may be applied to many of the present extruders and an apparatus that may be adapted to many of the present extruders.

A further object of this invention is to provide an apparatus that may be readily adjusted or regulated in accordance with the properties of the particular material being extruded.

A still further object is to produce extruded products having improved properties. Other objects and advantages of this invention will become apparent hereinafter as the description thereof proceeds, the novel features, arrangements and combinations being clearly pointed out in the specification as well as in the claims thereunto appended.

Figure 2:
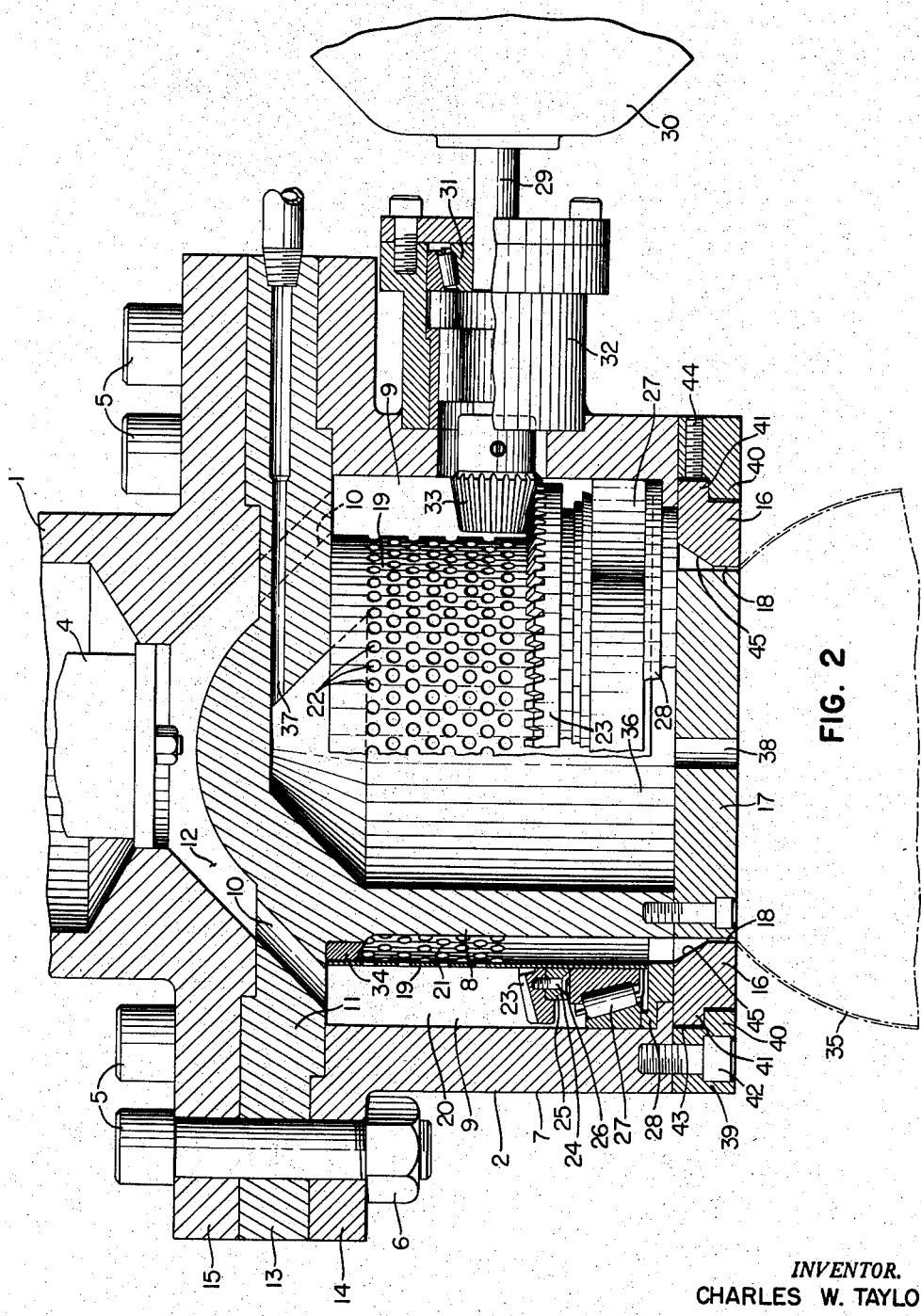

In the drawings:

Figure 1 represents an elevation, partly in section of an extruder apparatus, and Figure 2 is a partial section taken on line 2—2 of Fig. 1.

In Fig. 1, the extruder apparatus designed to extrude a thin-walled tube includes the material receiving chamber 1 and the extruder head 2. The plastic material is forced into the chamber 1 under pressure through a side inlet port 3, by any of the well known means and thence into the filter 4 arranged in the chamber 1. The filter 4 may be of any of the well known types used in extruding operations to remove foreign material from the plastic material. The particular apparatus to feed the plastic into the chamber 1, chamber 1 itself and filter 4 shown are only for the purpose of illustration and it is to be understood that any of the well known forms of such apparatus may be used.

The chamber 1 and the extruder head 2 as shown, are assembled by a series of bolts 5 and nuts 6 with the outlet or die opening of the head 2 on the end opposite the chamber 1 and will be explained in detail later in connection with Fig. 2.

In Fig. 2 an annular outer member 7 and a hollow closed end inner pin 8 are concentrically arranged to form an axially extending extruding chamber 9 into which the plastic material enters through the openings 10 in the spider 11 supporting the pin 8. The openings 10 coincide with the annular outlet opening 12 of the chamber 1. The flange portions 13 and 14 of the spider 11 and cylinder member 7 respectively are fastened to the flange 15 of the chamber 1 by the series of bolts 5 and nuts 6. Die members 16 and 17 fixed to the end of the cylinder 7 and pin 8 respectively form the extrusion opening 18. These members may be readily removed or replaced if desired to change the dimensions or shape of the extruded film or if either of the die members becomes damaged or worn as will become apparent later from the description.

An axially extending foraminous or perforated element 19 is positioned intermediate the cylinder member 7 and pin 8 in the chamber 9, forming two smaller chambers 20 and 21 in the chamber 9. As shown in Fig. 2, the member 19 is formed of light gauge metal such as stainless steel formed into an endless sleeve with a series of relatively small openings 22 formed therein through which the plastic material passes in its flow through the extruder head from chamber 20 to chamber 21. The foraminous element 19 also may be formed of materials such as screen, porous metals or ceramics, etc. that will permit the plastic to flow therethrough. The chambers 20 and 21 formed by the foraminous element 19 are arranged in a side by side relation so that the plastic material first enters chamber 20 through the openings 10 in the spider 11 then passes through the openings 22 of the foraminous element 19 into chamber 21 from which it is then forced out the die opening 18.

In order to eliminate the die or closure lines formed by the material passing around the portions of the spider between the openings, the foraminous element 19 is rotated about its longitudinal axis as the plastic material passes through the extruder head. In order to rotate the foraminous element 19, a ring gear 23 is mounted around the periphery of the foraminous element by means of screws 24 passing through ring 25 which is attached to the foraminous element 19, for example by soldering. As shown, the heads of the screws 24 are countersunk below the surface 26 of ring 25 which rests on the roller bearing 27. The bearing 27 is supported on the bushing 28 which lies between the cylinder 7 and pin 8 and also supports and forms a bearing surface for the end of foraminous element 19. A shaft 29 driven by a variable speed motor 30 passes through cylinder wall 7 into the chamber 9 and is supported by the bearing 31 in bearing housing 32 on the wall of chamber 9. A bevel gear 33 is fastened to the shaft 29 and engages the ring gear 23. The bushing 34 between the foraminous element 19 and the pin 8 maintains the foraminous element 19 in position during the operation of the head and provides a bearing surface on which the foraminous element rotates.

In the particular apparatus illustrated, the tube 35 of plastic material is expanded as it leaves the die opening 18 in accordance with practices well known in the art. Air pressure is admitted to the interior 36 of the pin 8 through the inlet 37 attached to a source of air pressure (not shown). The air pressure passes from the interior 36 of the pin 8 through the opening 38 into the plastic tube 35 which causes the tube 35 to expand. The inlet 37 is drilled through the spider intermediate a pair of the openings 10. The outer die member 16 is attached to the outer cylinder 7 by means of die mounting ring 39 having an inwardly extending shoulder portion 40 engaging the outwardly extending shoulder 41. The mounting ring 39 is fastened to the cylinder member 7 by means of a series of spaced cap screws 42. In order to provide for adjusting the position of the die 16, a slight clearance 43 is provided between the inner periphery of the mounting ring 39 and the outer periphery of the die 16 so that by adjusting the set screws 44 the die 16 may be accurately aligned with the inner die portion 17 to give a tube with a uniform wall gauge. The inwardly and downwardly extending bevel portion 45 in the die 16 provides for a graduated reduction of the thickness of the plastic as it approaches the die opening.

In accordance with the well known practices, all surfaces over which the plastic material must pass in its travel through the extruder head are preferably highly polished or plated. This not only decreases the resistance of the surfaces to the flow of the material but also minimizes the effect of any surface imperfections of the die parts on the extruded film.

In the operation of the machine, the plastic material is fed into the chamber 1 which includes a filter 4 thence through the outlet 12 into the extruder head 2, through the spider openings 10 into the chamber 20. From the chamber 20 it flows through the openings 22 of the foraminous element 10 into the inner chamber 21, thence through the unobstructed passage into the forming die and out the die opening 18 in the form of a tube. As the material is passing through the extruder head 2, the foraminous element 19 is rotated through the ring gear 23 and bevel gear 33. The speed of rotation is selected according to the particular material that is being extruded and depends upon such factors as rate of feed and discharge, viscosity, gauge of tube, etc. The speed is adjusted by regulating the speed of the motor 30 which drives the shaft 29.

By rotating the foraminous member 19 as the material passes through the extruder head, the direction of flow of the material is changed in a direction substantially transverse to its direction as it passes through the foraminous element. The material then changes direction of flow again in order to reach the die opening. This direction is substantially transverse both to the direction of flow through the foraminous element and the direction caused by the rotation of the formanious element. It is to be understood that the changes in the directions of flow may be in the range of 45° to 90°. It appears that the changes of direction of flow of the material as it passes through the extruder head produce a random or tangled arrangement of the molecules or particles which eliminates the die or closure lines. There should be no obstructions in the path of flow of the plastic material after the material has been subjected to the changes of flow direction, in order that die or closure lines will not again be produced in the extruded product. By the proper selection of the speed of rotation of the foraminous element, substantially all die and closure lines are eliminated from the extruded film.

It is obvious that many changes may be made in structural details of the apparatus to accomplish the same results. For example, if the material to be extruded is of a nature so as to not extrude satisfactorily if the gears are in contact with the melt, the drive for the foraminous member may be altered so that it is driven from outside the chamber. The change of direction caused by the rotation of the foraminous member may be accomplished in other ways such as by reciprocation, agitation, etc. of the foraminous element.

The invention can be used with any extrudable, plastic material and is particularly useful with materials with pronounced anisotropic characteristics. The invention is of special value with linear polymeric organic plastic materials such as synthetic linear polyamides (nylon), synthetic linear polyesters, polyethylene, vinyl chloride polymers and copolymers, including copolymers of vinylidene chloride with vinyl chloride (Saran), acrylate resins, polystyrene, ethyl cellulose, cellulose acetatebutyrate and rubber, both natural and synthetic. Polymeric ethylene terephthalate, polymeric ethylene isophthalate and copolymeric ethylene terephthalate-isophthalate constitute a particular class of materials. The plastic materials can, when desired, contain customary compounding ingredients, such as plasticizers, coloring materials, pigments, fillers, etc. The problems resulting from orientation or grain can be particularly troublesome when the plastic material is compounded with an anisotropic pigment.

While certain representative embodiments and details have been shown for the purpose of illustrating the invention, it will be apparent to those skilled in this art that various changes may be made therein without departing from the spirit or scope of the invention.

I claim:

1. A method of extruding plastic material to substantially eliminate orientation therein consisting of, passing said plastic material through a foraminous member into a chamber defining an unobstructed flow path for said material, displacing the plastic material in said flow path in a direction transversely of the direction of flow through the foraminous element, flowing said plastic material in said unobstructed flow path in a direction substantially normal to both the direction of flow through said foraminous element and the direction of displacement, and directing said plastic material through an unobstructed forming die adjacent the end of said chamber.

2. A method of extruding plastic material to substantially eliminate orientation therein consisting of, passing said plastic material through a foraminous member into a chamber defining an unobstructed flow path for said material, displacing the plastic material in said flow path in a direction transversely of the direction of flow through the foraminous element, flowing said plastic material in said unobstructed flow path in a direction substantially normal to both the direction of flow through said foraminous element and the direction of displacement, and directing said plastic material in an undivided stream through a forming die adjacent the end of said chamber.

3. A method of extruding plastic material to substantially eliminate orientation therein consisting of, passing said plastic material through a foraminous member into a chamber defining an unobstructed flow path for said material, displacing the plastic material in said flow path in a direction transversely of the direction of flow through the foraminous element, flowing said plastic material in said unobstructed flow path in a direction substantially normal to both the direction of flow through said foraminous element and the direction of displacement, and directing said plastic material in an undivided stream through an unobstructed forming die adjacent the end of said chamber.

4. In an extruder for forming plastic material comprising an extruding head, inlet means to said head, means to feed the plastic material through said inlet means to said head, and outlet means in said head adapted to retain a forming die for said material, an improved extruding chamber for extruding plastic material in a substantially unoriented form consisting of a hollow cylinder between said inlet means and said outlet means with said inlet and outlet means located substantially at opposite ends thereof, a pin concentrically supported in said cylinder from the end thereof opposite said outlet means to form with said cylinder an annular chamber having an inlet and outlet for said plastic material, an annular foraminous element in said chamber and dividing the same into an inlet chamber and an outlet chamber with at least a portion of said inlet and outlet chambers being in side by side relationship, the chamber on the outlet side of said element providing an unobstructed flow path for said plastic material to the forming die in said outlet with said flow path extending in a direction substantially parallel to the surface of the foraminous element, means to continuously move said foraminous element as the plastic material passes from the inlet side to the outlet side thereof to the unobstructed flow path to said outlet means, and an unobstructed forming die in said outlet means to form said plastic material in an undivided stream.

5. In an extruder for forming plastic material comprising an extruding head, inlet means to said head, means to feed the plastic material through said inlet means to said head, and outlet means in said head adapted to retain a forming die for said material, an improved extruding chamber for extruding plastic material in a substantially unoriented form consisting of a hollow cylinder between said inlet means and said outlet means with said inlet and outlet means located substantially at opposite ends thereof, a pin concentrically supported in said cylinder from the end thereof opposite said outlet means to form with said cylinder an annular chamber having an inlet and outlet for said plastic material, a rotatably mounted annular foraminous element in said chamber and dividing the same into an inlet chamber and an outlet chamber with at least a portion of said inlet and outlet chambers being in side by side relationship, the chamber on the outlet side of said element providing an unobstructed flow path for said plastic material to the forming die in said outlet with said flow path extending in a direction substantially parallel to the surface of the foraminous element, means to continuously rotate said foraminous element as the plastic material passes from the inlet side to the outlet side thereof to the unobstructed flow path to said outlet means, and an unobstructed forming die in said outlet means to form said plastic material in an undivided stream.

6. In an extruder for forming plastic material comprising an extruding head, inlet means to said head, means to feed the plastic material through said inlet means to said head, and outlet means in said head adapted to retain a forming die for said material, an improved extruding chamber for extruding plastic material in a substantially unoriented form consisting of a hollow cylinder between said inlet means and said outlet means with said inlet and outlet means located substantially at opposite ends thereof, an annular foraminous element in said chamber and dividing the same into an inlet chamber and an outlet chamber with at least a portion of said inlet and outlet chambers being in side by side relationship, the chamber on the outlet side of said element providing an unobstructed flow path for said plastic material to the forming die in said outlet means with said flow path extending in a direction substantially parallel to the surface of the foraminous element, means to direct the plastic material along said unobstructed flow path, means to continuously move said foraminous element as the plastic material passes from the inlet side to the outlet side thereof into the unobstructed flow path to said forming die, and an unobstructed forming die in said outlet means to form said plastic material in an undivided stream.

7. In an extruder for forming plastic material comprising an extruding head, inlet means to said head, means to feed the plastic material through said inlet means to said head, and outlet means in said head adapted to retain a forming die for said material, an improved extruding chamber for extruding plastic material in a substantially unoriented form consisting of a hollow cylinder between said inlet means and said outlet means with said inlet means and outlet means located substantially at opposite ends thereof, an annular foraminous element rotatably mounted in said chamber and dividing the same into an inlet chamber and an outlet chamber with at least a portion of said inlet and outlet chambers being in side by side relationship, the chamber on the outlet side of said element providing an unobstructed flow path for said plastic material to the forming die in said outlet means with said flow path extending in a direction substantially parallel to the surface of the foraminous element, means to direct the plastic material along said unobstructed flow path, means to continuously rotate said foraminous element as the plastic material passes from the inlet side to the outlet side thereof and to the unobstructed flow path to said forming die, and an unobstructed forming die in said outlet means to form said plastic material in an undivided stream.

References Cited in the file of this patent

UNITED STATES PATENTS

| | | |
|---|---|---|
| 1,595,470 | Johnson | Aug. 10, 1926 |
| 2,750,627 | Gray | June 19, 1956 |

FOREIGN PATENTS

| | | |
|---|---|---|
| 109,054 | Germany | Mar. 24, 1899 |
| 649,873 | Great Britain | Feb. 7, 1951 |